Oct. 25, 1966  J. F. STEVENSON  3,281,681
DEVICE FOR MEASURING THE ELECTRICAL RESISTANCE OF MOLTEN GLASS
Filed April 11, 1962
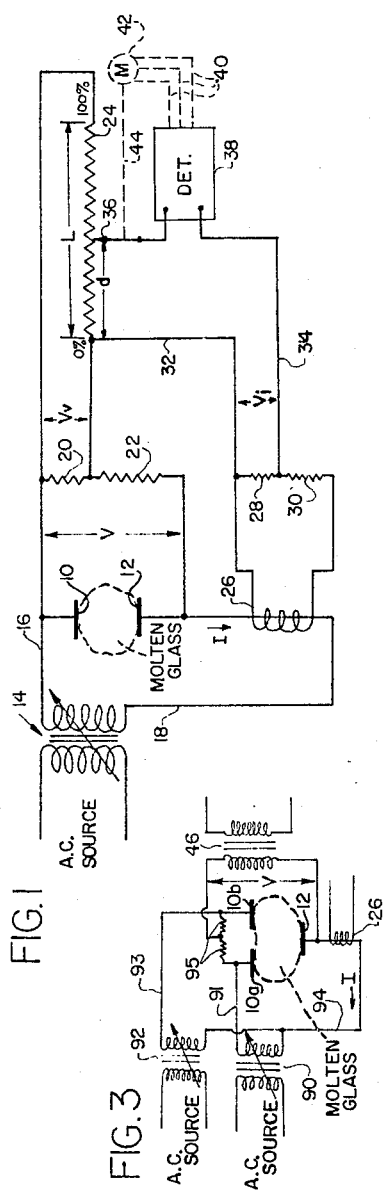
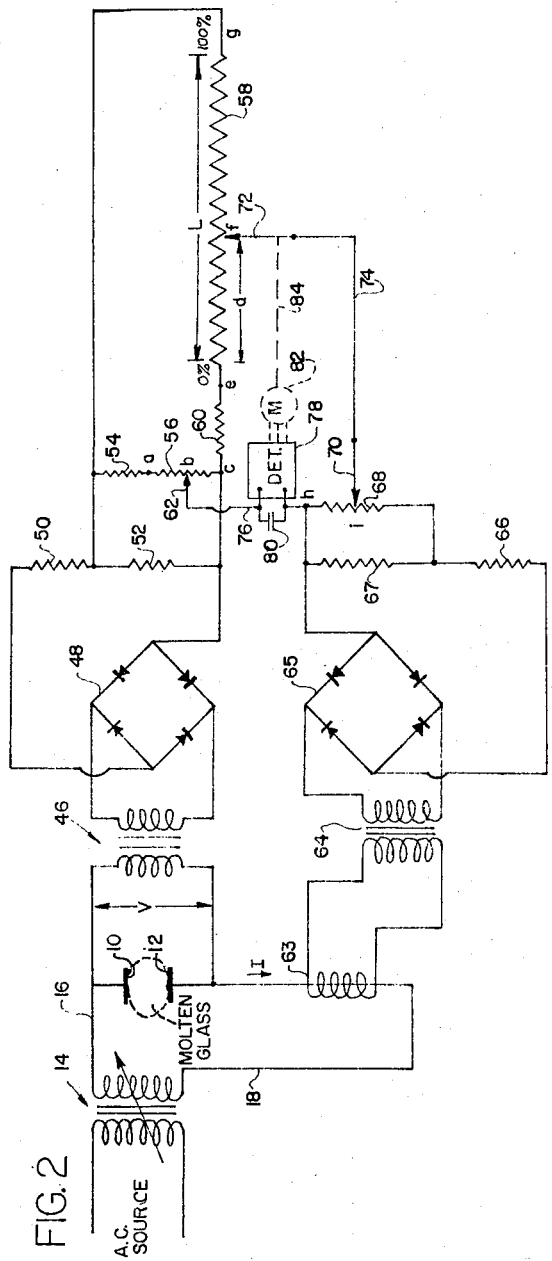
INVENTOR.
JAMES F. STEVENSON
BY
Teller, McCormick, Paulding & Huber
ATTORNEYS – # United States Patent Office 3,281,681
Patented Oct. 25, 1966

3,281,681
DEVICE FOR MEASURING THE ELECTRICAL RESISTANCE OF MOLTEN GLASS
James F. Stevenson, West Hartford, Conn., assignor to Emhart Corporation, a corporation of Connecticut
Filed Apr. 11, 1962, Ser. No. 186,736
8 Claims. (Cl. 324—65)

This invention relates to glass making apparatus, and deals more particularly with a device usable with such apparatus for determining and providing a continuous indication or record of the electrical conductance or resistance of a body of molten glass.

The device of this invention may be used to measure the electrical conductance or resistance of any body of glass hot enough to carry a measurable electrical current, and it finds particular utility in connection with glass feeders of the type including a feeding chamber supplied with molten glass from the forehearth of a melting furnace and in which feeding chamber the glass is maintained at a desired delivery temperature by means of electrical currents passed through the glass and between two or more electrodes submerged therein. It is a known fact that the electrical conductivity or resistivity of molten glass bears a definite relationship to its temperature. Therefore by controlling the heating currents passing between the electrodes in response to the electrical conductance or resistance encountered by such currents and appearing across the electrodes, the temperature of the glass in the feeding chamber may be maintained at the desired delivery temperature.

The general object of this invention is therefore to provide a simple, efficient and accurate device for determining the electrical conductance or resistance of a body of molten glass. In keeping with this general object, a more particular object is to provide a conductance or resistance measuring device which is especially useful in connection with electric glass heaters wherein electric currents are passed through the glass and between two or more electrodes in contact with the glass, the device being operable to determine the glass conductance or resistance in accordance with the voltage appearing across and the current passing between said heating electrodes.

A further object of this invention is to provide a glass conductance or resistance measuring device of the foregoing character adapted to provide a continuous indication of the measured quantity and which may be used with a controller for regulating the heat input to a body of glass to maintain it at a constant or desirable temperature.

A more specific object of this invention is to provide a glass conductance or resistance measuring device wherein the measurement is based on Ohm's law and which device continuously performs the required division of voltage by current, or current by voltage, and provides a mechanical displacement or other indication directly related to the quotient.

Other objects and advantages of the invention will be apparent from the following description and from the drawings forming a part hereof.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawings:
FIG. 1 is a schematic circuit diagram of a simplified embodiment of the invention employing alternating currents in the measuring circuit.

FIG. 2 is a schematic circuit diagram of a more refined embodiment of the invention employing direct currents in the measuring circuit.

FIG. 3 is a schematic circuit diagram showing a portion of a device similar to that of FIG. 2, but wherein the upper electrode is comprised of two separate portions each maintained at a slightly different electrical potential.

*Measuring device of FIG. 1*

A simplified measuring device embodying the present invention and employing alternating currents in the measuring circuit is shown in FIG. 1. This use of alternating current in the measuring circuit of the simplified device is in turn dictated by the fact that, due to the electrical properties of glass, heating currents passed therethrough are preferably, if not necessarily, of an alternating character. Unidirectional or direct currents of a size sufficient for heating require the application of voltages which tend to cause electrolysis of the glass at the electrodes. The use of alternating heating current avoids this difficulty.

In FIG. 1 the reference numerals 10 and 12 indicate two electrodes engageable with a body of molten glass contained in a feeding chamber or the like and between which electrodes an alternating electric current is passed for the purpose of heating the glass. These electrodes are supplied with electrical power by suitable means such as a variable transformer 14 whereby the amount of power delivered by the electrodes to the glass may be varied to control the heating and temperature of the glass. The transformer 14 has its primary winding connected to a suitable alternating current supply which may, for example, be at 220 volts and 60 cycles per second, and has its secondary winding connected to the electrodes 10 and 12 by two lines 16 and 18, respectively. As a result of this an alternating voltage having an effective value V is impressed across the electrodes 10 and 12, and this causes an alternating current of effective value I to flow through the glass and between the electrodes.

If V is the voltage appearing across the electrodes and I is the current passing therebetween, the resistance of the glass through which the current passes is from Ohm's law: $R = V/I$. Likewise, the conductance of the glass is the reciprocal of the resistance or: $G = I/V$. Generally, the conductance of the glass is the easier value to visualize since it increases with increases in the glass temperature and since the purpose of measuring the resistance or conductance of the glass is usually to determine its temperature. In any event, the measuring device provided by this invention serves to perform the required division of voltage by current, or current by voltage, and to provide an indication or mechanical motion directly related to the quotient and accordingly directly related to the resistance or conductance of the glass.

In accordance with the invention this division of voltage by current, or vice versa, is obtained through the use of a generally conventional potentiometer including a slidewire and slider and wherein one voltage is balanced against another by movement of the slider over the slidewire. To measure conductance, and in the simplest case not involving zero and span adjustments and the like, a voltage directly related to that appearing across the heating electrodes is applied across the potentiometer slidewire and another voltage directly related to the current passing between the electrodes is applied between one end of the slidewire and its slider. Therefore, when the slider is moved to the null position at which no current flows therethrough the displacement of the slider from said one end of the slidewire will be linearly related to the conductance of the glass as hereinafter described in more detail. Where it is desired to measure resistance the connections may be reversed so that a voltage related to the current I is applied across the slidewire and a voltage related to the voltage V is applied between one end of the slidewire and the slider. Accordingly, when the slider is moved to a null position its displacement will be a direct or linear indication of the electrical resistance of the glass.

In the device shown in FIG. 1 the connections are such as to cause the slider or displacement to linearly correspond to the glass conductance. This, however, assumes the use of a linear slidewire and it will be understood that if a non-linear scale factor is desired this may be achieved through the corresponding use of a non-linear slidewire. Also, in FIG. 1 the entire current related voltage is applied between one end of the slidewire and the slider with the result that a zero position of the slider corresponds to zero conductance. If desired, one or more fixed or adjustable resistors may be employed in conjunction with the slidewire and the current related voltage applied across both a portion of the slidewire and said resistors so that only a portion of the current related voltage is balanced by the slidewire. By this means the zero position of the slider may be made to correspond to a value of conductance other than zero as described in more detail in connection with FIG. 2.

Various different means may be employed for producing a voltage related to that appearing across the heating electrodes, and in FIG. 1 this means is shown to comprise two resistors 20 and 22 connected across the electrodes as shown. The resistors 20 and 22 form a voltage divider with the result that the voltage $V_v$ appearing across the resistor 20 is directly proportional to the voltage V. The potentiometer slidewire, indicated at 24, is connected in parallel with the resistor 20 so as to also have the voltage $V_v$ imposed across its ends. The total resistance of the series-parallel combination of the resistors 20 and 22 and the slidewire 24 is relatively high in comparison to that of the body of glass so that a very small and negligible amount of current flows through the resistor 22 in comparison to the current passing between the electrodes 10 and 12. Therefore, the current I flowing through the line 18 may be considered to be comprised entirely of the current passing between the electrodes.

A voltage related to the current I is produced by means of a current transformer indicated at 26 and which as shown may be of the bar type wherein the line 18 comprises the primary winding and extends through the secondary winding so that the secondary winding surrounds the line. The voltage appearing across the terminals of the secondary coil of the current transformer is applied across a voltage dividing set of series resistors 28 and 30 with the result that a voltage $V_i$ appears across the resistor 28 and is proportionally related to the current I. The voltage $V_i$ is in turn applied by the lines 32 and 34 across the zero end of the slidewire 24 and the potentiometer slider 36. In the line 34 is a suitable current detector 38 for measuring the amount of current flowing through the slider 36 and whereby the slider may be adjusted relative to the slidewire 24 to achieve a null or balanced condition whereat no current flows through the slider 36. When this null condition exists the voltage $V_i$ is balanced by the voltage drop across the corresponding portion of the slidewire caused by the current passing therethrough as the result of the voltage $V_v$ impressed across the entire length of the slidewire.

If the slidewire 24 is a linear slidewire of total length L and the displacement of the slider 36 from the zero of left-hand end of the slidewire at a null condition is $d$, such slider displacement may be expressed as a decimal portion D of the length L, or $$D = \frac{d}{L}$$

In terms of this decimal displacement value D, the slidewire voltage opposing and balancing the current related voltage is therefore $DV_v$. Therefore, from the balanced voltage condition $$V_i = DV_v \qquad (1)$$

but since $V_i$ is directly related to the current I and $V_v$ is directly related to the voltage V $$V_i = K_1 I, \text{ and} \qquad (2)$$
$$V_v = K_2 V \qquad (3)$$

where $K_1$ and $K_2$ are proportionality constants. Therefore substituting Equations 2 and 3 into 1

$$K_1 I = DK_2 V, \text{ or}$$
$$I/V = DK_3$$

where $$K_3 = \frac{K_2}{K_1}$$

The quantity $I/V$ will be recognized as the conductance of the glass between the two electrodes, therefore $$G = DK_3 \qquad (4)$$

Accordingly, it is seen from the above Equation 4 that the conductance is directly proportional to the slider displacement D so that this displacement may be measured or otherwise utilized to give indication of the conductance.

The current detector shown at 38 may be a simple A.C. galvanometer providing a visual indication of the current by means of which visual indication the slider 36 may be manually adjusted to a null position to provide a measurement of the conductance. Preferably, however, the detector 38 comprises an amplifier and other means for producing an output signal related to the current passing through the slider 36 and which output signal is delivered as by lines 40, 40 to a reversible balance motor 42 which in response to the output signal drives the slider 36 through a mechanical linkage 44 in the proper direction to achieve a null condition. In this way the detector 38 and its associated amplifier and the like operate continuously together with the balance motor 42 to maintain the slider 36 continuously adjusted at or near a null position. Therefore, the position of the slider gives a continuous indication of the conductance of the glass. Suitable detectors, amplifiers, balance motors and the like are well known in the art and by themselves form no part of this invention.

Although the measuring circuit shown in FIG. 1 presents the general concept of the present invention and is generally workable to provide a fairly good indication of conductance or resistance, the use of alternating current in the measuring circuit often makes it difficult to obtain a precise null or balance condition due, among other things, to unavoidable capacitance and inductance effects. Therefore, the voltage and current related signals used in the measuring circuit are preferably direct current signals. Reference is therefore made to FIG. 2 which shows a measuring device based on the same principle as the device of FIG. 1, but which includes rectifying means to enable the potentiometer or measuring circuit to operate on direct currents and which further includes refinements to enable adjustments of the span and zero position of the slider.

*Measuring device of FIG. 2*

Referring to FIG. 2, the glass heating portion of the circuit is substantially the same as that illustrated in FIG. 1 and includes two electrodes 10 and 12 supplied with alternating current electrical power through a variable transformer 14 and lines 16 and 18.

Means for producing a unidirectional voltage signal related to the effective voltage V appearing across the electrodes 10 and 12 is provided and includes a transformer 46, a bridge rectifier 48, and a voltage divider connected across the output of the rectifier and comprised of two resistors 50 and 52. Connected in parallel with the resistor 52 is a first resistance branch containing series resistors 54 and 56, and a second resistance branch containing in series the potentiometer slidewire 58 and another resistor 60. The resistor 56 comprises part of a zero adjusting potentiometer and has associated therewith a wiper 62. From this it will be noted that a fixed resistive load is applied to the output of the rectifier 48 and that therefore for a given effective voltage V appearing across the electrodes 10 and 12 a corresponding and directly related direct current voltage will be applied across the resistor 52 and each of the two parallel branches connected therewith. Likewise, the voltage drop across each of the resistors 54, 56, 60 and the slidewire 58 will be directly related to the electrode heating voltage V. Considering the voltage drop across the resistors 56, 60 and the slidewire 58 and using the reference letters applied to FIG. 2 it may therefore be said that:

$$V_{ac}=K_1V \quad (5)$$
$$V_{ec}=K_2V, \text{ and} \quad (6)$$
$$V_{ge}=K_3V \quad (7)$$

where $K_1$, $K_2$ and $K_3$ are proportionality constants.

Likewise, if $D_1$ equals the decimal displacement of the slider 62 from the lower end of the resistor 56, $$V_{bc}=D_1K_1V \quad (8)$$

Means for producing a direct current voltage related to the current I passing through the line 18 is also provided and includes a current transformer 63, a second transformer 64, a bridge rectifier 65 and a voltage divider circuit connected to the output of the rectifier 65 and including a resistor 66 arranged in series with a parallel combination of resistors 67 and 68. The current transformer 63 may take various forms, but in the present case it is illustrated as being of the bar type having a single secondary coil surrounding the line 18. The terminals of this coil are in turn connected to the primary winding of the transformer 64 and the secondary winding of said latter transformer is connected across the input terminals of the rectifier 65. From this it will be understood that a direct current, or unidirectional, voltage is produced across the resistor 67 and across the resistor 68 which voltage is proportionally related to the effective value of the current I. The resistor 68 comprises part of a span adjustment device and includes a wiper 70 which is manually adjustable to various positions along the length of the resistor 68. Since the voltage drop across the resistor 68 is related to the current I, it therefore follows that if $D_2$ is the decimal displacement of the wiper 70 from the upper end $h$ of the resistor 68, the voltage appearing between the point $h$ and the wiper 70 will be:

$$V_{ih}=D_2K_4I, \quad (9)$$

where $K_4$ is a fixed proportionality constant.

The wiper 70 of the resistor 68 is connected to the slider 72 of the potentiometer slidewire 58 by a line 74. Likewise, the upper end or terminal $h$ of the resistor 68 is connected to the wiper 62 of the zero adjust resistor 56 by the line 76 containing a current detecting device 78. The current flowing through the line 76 is equal to the current flowing through the line 74 and therefore the detector 78 could also be located in the line 74 if desired. In either case it will provide an indication or signal related to the current passing through the slider 72. As shown, a capacitor 80 is or may be connected across the terminals of the detector for bypassing or shunting from the detector any alternating current components which may be present in the line 76.

From the foregoing it will be noted that the current related voltage $V_{ih}$ appearing across the upper portion of the resistor 68 is applied between the wiper 62 and slider 72 or between the points $b$ and $f$. Also appearing between these same two points is a voltage $V_v$ related to the electrode voltage V and comprised of the summation of the voltages $V_{fe}$, $V_{ec}$, and $V_{cb}$.

If $D_3$ equals the decimal displacement of the slider 72 from the left-hand or zero end of the slidewire $$\left(D_3=\frac{d}{L}\right)$$

then:

$$V_{fe}=D_3F_{ge}=D_3K_3V \quad (10)$$

The voltage $V_{cb}$ is opposite in direction to the voltages $V_{fe}$ and $V_{ec}$ and is the negative of the voltage $V_{bc}$. Thus, balancing the current related voltage against the voltage drops across the slidewire and resistors 56 and 60

$$V_{ih}=V_{fe}+V_{ec}+V_{cb}, \text{ or} \quad (11)$$
$$D_2K_4I=D_3K_3V+K_2V-D_1K_1V$$
$$=(D_3K_3+K_2-D_1K_1) \quad (12)$$

Solving for conductance, $$G=\frac{I}{V}=\frac{D_3K_3+K_2-D_1K_1}{D_2K_4} \quad (13)$$

From the Equation 13 it will be noted that for any given setting of the slider 72 and wiper 62, which fixes the quantities $D_3$ and $D_1$, the wiper 70 may be adjusted to vary the quantity $D_2$ and this will have the effect of varying the amount of conductance represented by the slider position. Accordingly, the wiper 70 is seen to be a span adjustment device whereby the range of conductances covered by the full length of the slidewire may be varied. From Equation 13 it will also be noted that if the slider 72 is set on the zero position of the slidewire so that $D_1=0$, and the wiper 70 is held at a given position so that $D_2$ is fixed, then the conductance is dependent on $D_3$ which may be varied by adjusting the wiper 62. Therefore, the wiper 62 is seen to be a zero adjustment device whereby the value of the conductance represented by the zero position of the slidewire may be varied. If the wiper 62 is adjusted to the point where $D_1K_1=K_2$ then the zero position of the slidewire will correspond to zero conductance.

The current detector 78 may be a simple current indicating device such as a galvanometer with a visual scale and pointer whereby an operator observing the detector may move the potentiometer slider 72 to a position of balance at which no current flows through the line 76 and through the wiper 72. When this balanced condition is obtained, the required division of voltage by current is achieved and the displacement of the slider 72 on the slidewire 58 will be an indication of the conductance of the glass. Preferably, however, the detector 78 includes an amplifier and other associated means for producing an output signal which is directly related to the direction of the current passing through the line 76 and which is transmitted to a reversible balance motor 82 which in response to the signal rotates in the proper direction as to move the potentiometer slider 72 through a suitable linkage 84 to a balanced or null condition on the slidewire. Such balancing means are well known in the potentiometer art and operate continuously to maintain the slider 72 at or near a balanced condition to provide a continuous indication of the conductance. Once this indicating is obtained an associated control means can be operated in response thereto to adjust the variable transformer 14 or other control means for regulating the voltage applied to the electrodes 10 and 12 to maintain a desired glass temperature.

*Measuring device of FIG. 3*

FIGS. 1 and 2 show measuring devices wherein the glass heating electrodes 10 and 12 for convenience have been shown to each comprise a single electrode element. In actual practice, however, each of these electrodes may comprise two or more electrode portions which are maintained at slightly different potentials in order to provide for a particular desired heating effect in the glass. It is, therefore, to be understood that the measuring devices shown in FIGS. 1 and 2 may also be used in such situations, and in which case means are provided whereby the effective voltage V measured by the measuring circuit is equal to the difference between the average potential of one set of electrode portions and the average potential of the other set of electrode portions. By way of example, FIG. 3 shows a portion of a device generally similar to that of FIG. 2 except for having the upper electrode 10 divided into two portions 10a and 10b.

Referring to FIG. 3 the upper electrode portion 10a is supplied with alternating electrical power from a variable transformer 90 and the electrode portion 10b is supplied with electrical power from a separate variable transformer 92. One side of the secondary winding of the transformer 90 is connected by the line 91 to the electrode portion 10a and the similar polarity side of the secondary winding of the transformer 92 is connected to the electrode portion 10b by the line 93. The lower electrode 12 is connected by the line 94 in common to the opposite sides of the secondary windings of the two transformers. Therefore, by adjusting the transformers the voltage appearing between each upper electrode portion and the lower electrode may be varied independently of the voltage impressed between the other upper electrode portion and the lower electrode portion.

From this it will be observed that the two upper electrode portions may be at different potentials and that the conductance or resistance of the glass located between the upper electrode portions and the lower electrode will be dependent on the total current I passing between the upper and lower electrodes and on the average voltage V maintained between such electrodes. This average voltage V is in turn equal to the difference between the potential of the lower electrode 12 and the average potential of the two upper electrode portions 10a and 10b. In order to obtain an output signal equal to this average voltage the two upper electrode portions have connected therebetween and in series two relatively large and equal resistors 95, 95. The common terminal of these two resistors is therefore equal to the average potential of the two upper electrode portions and the potential difference between it and the lower electrode 12 is equal to the desired average voltage V. This terminal and the lower electrode 12 are therefore connected to the primary winding of the transformer 46 as shown to provide an input for the measuring portion of the circuit.

The invention claimed is:

1. A device for measuring the electrical resistance of molten glass contained in a heating chamber and heated by an electric current passed between two electrodes in contact with the glass and fed thereto by a supply line, said device comprising a circuit connected across said electrodes and producing a first voltage signal proportional to the voltage appearing across said electrodes, another circuit inductively coupled with said supply line and producing a second voltage signal proportional to the current fed to said electrodes by said supply line, resistance means including a slidewire resistor and a slider movable thereover, means for imposing one of said first and second voltage signals across the ends of said resistance means and for imposing the other of said voltage signals across said slider and one end of said resistance means, and means responsive to the current passing through said slider for moving the same to a null position on said slidewire resistor at which null position no current passes through said slider with the result that its position on said slidewire resistor when at said null position is an indication of the resistance of said glass.

2. A device for measuring the electrical resistance of glass, said device comprising two spaced electrodes for engaging a body of said glass, means for feeding an alternating electrical current to said electrodes for passage between said electrodes and through said body, resistance means including a slidewire resistor and a slider movable thereover, means including a rectifier for developing a first substantially unidirectional voltage signal proportional to the effective value of the alternating current voltage appearing across said two spaced electrodes, means for developing a second substantially unidirectional voltage signal proportional to the effective value of the alternating current fed to said electrodes, means for imposing one of said first and second voltage signals across the ends of said resistance means and for imposing the other of said voltage signals across said slider and one end of said resistance means, and means responsive to the current passing through said slider for moving the same to a null position on said slidewire resistor at which null position no current passes through said slider with the result that its position on said slidewire resistor when at said null position is an indication of the resistance of said body of glass.

3. A device for measuring the electrical resistance of molten glass contained in a heating chamber and heated by an alternating electric current passed between two electrodes in contact with the glass and fed thereto by a supply line, a transformer having primary and secondary windings with said primary winding being connected across said electrodes, means including a first rectifier connected with said secondary winding so as to produce a first unidirectional output voltage signal proportionally related to the effective value of the alternating current voltage appearing across said electrodes, a circuit inductively coupled with said supply line and including means for developing a second unidirectional voltage signal proportional to the effective value of the current fed to said electrodes by said supply line, means for imposing one of said first and second voltage signals across the ends of said resistance means and for imposing the other of said voltage signals across said slider and one end of said resistance means, and means responsive to the current passing through said slider for moving the same to a null position on said slidewire at which null position no current passes through said slider with the result that its position on said slidewire when at said null position is an indication of the resistance of said glass.

4. A device as defined in claim 3 further characterized by said circuit inductively coupled with said supply line including a current transformer having a secondary winding inductively coupled with said supply line, a transformer having its primary winding connected in series with the secondary winding of said current transformer, and means including a second rectifier connected with the secondary winding of said latter transformer so as to produce a second unidirectional output voltage signal proportionally related to the effective value of the current fed to said electrodes by said supply line.

5. A device as defined in claim 3 further characterized by means for adjusting the proportional relation existing between the voltage signal applied across said slider and one end of said resistance means and the quantity it represents so as to provide a span adjustment whereby the value of resistance represented by any given slider position may be varied.

6. A device as defined in claim 3 further characterized by said resistance means including an adjustable resistor connected in series with said slidewire resistor between said slider and said one end of said resistance means to provide a zero adjustment whereby the value of resistance represented by the zero position of said slider on said slidewire resistor may be varied.

7. A device as defined in claim 3 further characterized by at least one of said electrodes comprising a plurality of electrode portions capable of being maintained at different electrical potentials, and means for imposing across the primary winding of said transformer a voltage equal to the average voltage existing between said two electrodes.

8. A device for measuring the electrical resistance of molten glass contained in a heating chamber and heated by an alternating electric current passed between two spaced electrodes in contact with the glass and fed thereto by a supply line, said device comprising first circuit means connected across said electrodes and producing a first unidirectional voltage signal directly related to the effective value of the alternating voltage appearing across said electrodes, second circuit means coupled with said supply line and producing a second unidirectional voltage signal directly related to the effective value of the alternating current passing through said supply line, resistance means including a slidewire resistor and a slider movable thereover, means for imposing one of said voltage signals across the ends of said resistance means and for imposing the other of said voltage signals across one end of said resistance means and said slider, means for detecting the flow of current through said slider, and means for moving said slider relative to said slidewire to enable the same to be brought to a null position at which no current flows through said slider and which null position is an indication of the resistance of said glass.

References Cited by the Examiner

UNITED STATES PATENTS

| | | | |
|---|---|---|---|
| 1,822,075 | 9/1931 | Aronoff | 324—63 X |
| 2,245,124 | 6/1941 | Bonn | 324—63 X |
| 2,363,372 | 11/1944 | White | 324—98 |
| 2,536,245 | 1/1951 | Wills | 324—63 X |
| 2,879,472 | 3/1959 | Worden | 324—64 X |
| 2,884,594 | 4/1959 | Ludvigsen | 324—65 X |

WALTER L. CARLSON, *Primary Examiner.*

C. A. S. HAMRICK, C. F. ROBERTS,
*Assistant Examiners.*